United States Patent

Brammall

[11] Patent Number: 4,728,132
[45] Date of Patent: Mar. 1, 1988

[54] BOLT LOCK

[75] Inventor: Terrence N. Brammall, Angola, Ind.

[73] Assignee: Trans-Guard Industries, Inc., Angola, Ind.

[21] Appl. No.: 803,317

[22] Filed: Dec. 2, 1985

[51] Int. Cl.$^4$ .................................... F16B 21/07
[52] U.S. Cl. .................................. 292/329; 292/327; 292/328; 411/508; 411/512; 411/519
[58] Field of Search ....... 292/327, 328, 329, DIG. 32; 411/352, 353, 512, 509, 510, 517–519

[56] References Cited

U.S. PATENT DOCUMENTS 3,951,443  4/1976  Barnaby ............................. 292/327

FOREIGN PATENT DOCUMENTS 1438860  7/1965  France ............................. 411/517
889926   8/1978  U.S.S.R. ........................... 411/433

Primary Examiner—William F. Pate, III
Assistant Examiner—Michael Safavi
Attorney, Agent, or Firm—Carella, Byrne, Bain & Gilfillan

[57] ABSTRACT

A bolt lock, for receiving and locking the end of a bolt having a head portion with a locking shoulder, said lock comprising a housing having internal jaws forming a central aperture, said jaws being expansible to allow the head of the bolt to snap through the opening so the the bolt shoulder latches behind the jaws. The jaws are retained in the housing above an aperture in the body which receives the inserted bolt head and below a bolt aperture in the upper portion of the housing, so that when the bolt is assembled, axial movement thereof causes the edges of the apertures to contact the internal jaws around and in spaced relation to the central aperture thereof. The jaws have upper and lower surfaces which are slightly inclined toward each other in relation to the axis of the central opening from the central aperture to the periphery of the jaws. The surface of the jaws therefore contact the edges of the upper and lower apertures at a slight angle to the axis thereof, so that vertical forces applied to the jaws by impacts to the bolt or housing tend to force the jaws toward the closed position.

2 Claims, 3 Drawing Figures

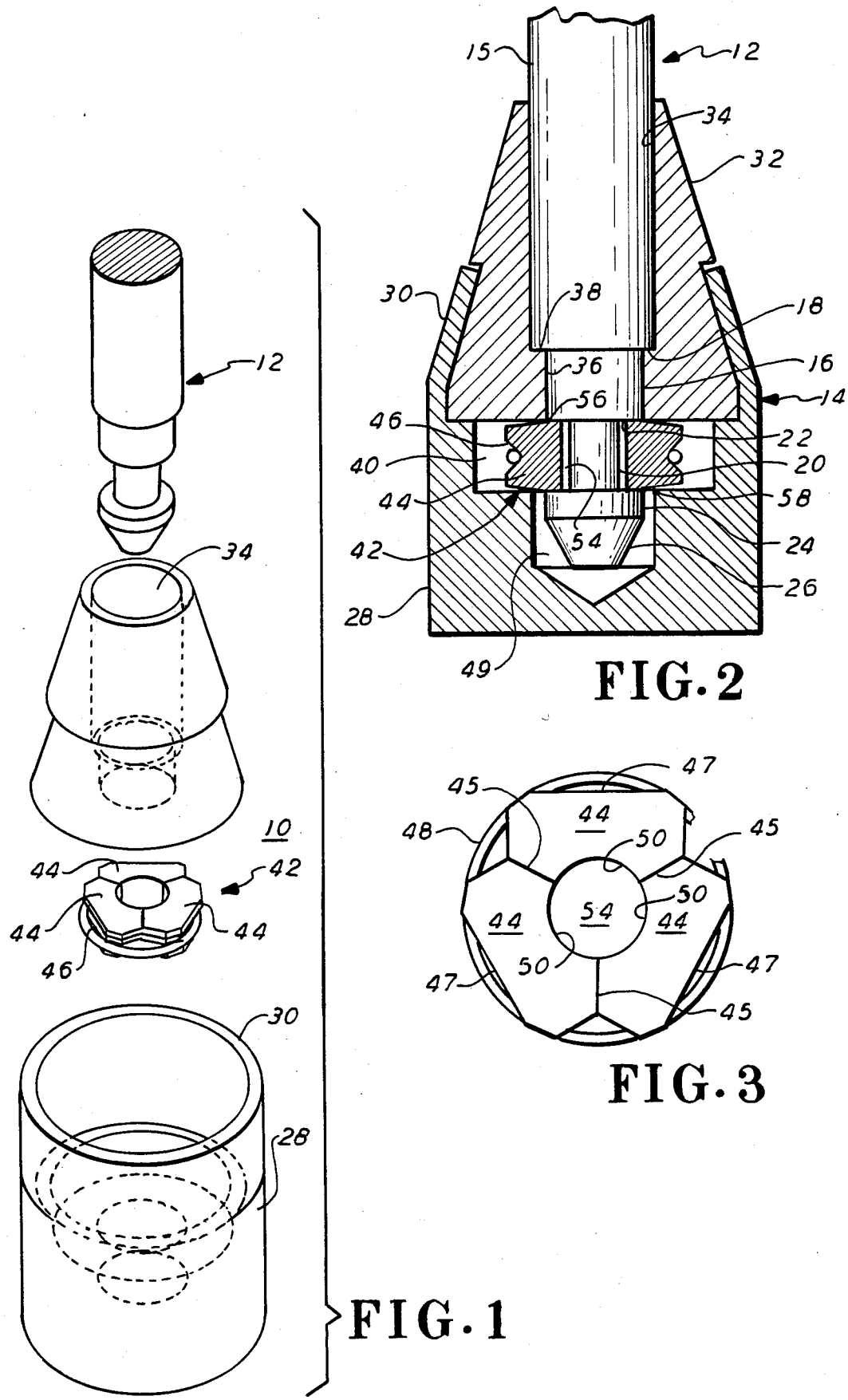

BOLT LOCK

BACKGROUND OF THE INVENTION

Locking devices which provide a housing with internal spring loaded jaws for receiving and locking the head of a shouldered stud are well known in the art and are widely used in the transportation industry to lock the doors of freight cars and trucks. However such devices are susceptible to being broken by applying a hammer blow to the housing, which transmits a bending moment to the jaws and tends to move them toward the open position.

SUMMARY OF THE INVENTION

This invention provides a lock of the type described, in which a housing is provided with a group of internal jaws forming a central opening for receiving the head of a shouldered stud in locking engagement. Spring means is provided to bias the jaws to the closed position. The jaws are retained between upper and lower members having apertures for receiving the stud. The jaw surfaces are tapered toward each other from the inside edge to the outside edge, so that the edges of the upper and lower apertures contact the tapered surfaces of the jaws around the central aperture and in spaced relation thereto. Forces applied to the jaws by the housing portions above and below the jaws therefore tend to force the jaws toward the closed position.

BRIEF DESCRIPTION OF THE FIGURES OF THE DRAWING

FIG. 1 is an exploded view of the components of a bolt lock embodying the features of the invention.

FIG. 2 is a view in elevation, partly in section, of the assembled bolt lock.

FIG. 3 is an enlarged top plan view of the locking jaws used in the assembly of FIG. 3.

DESCRIPTION OF THE ILLUSTRATED EMBODIMENT

Referring to the drawing, there is illustrated a locking seal assembly 10, which comprises a lock bolt 12 and a bolt locking device 14 which may be assembled into locking relationship. The bolt 12 may have any desired configuration for the particular device to be sealed, and has a shank 15 with a locking end which has a reduced portion 16 forming a first shoulder 18 and a reduced neck 20 forming a locking shoulder 22 disposed rearwardly from a head 24 having a tapered forward end 26.

The bolt locking device comprises a housing formed of a lower or base portion 28 having an upstanding peripheral wall 30, the upper end of which is tapered inwardly, and an upper housing portion 32 which is retained in assembly with the lower portion by said wall 30. The upper portion 32 has a central opening 34 for receiving the bolt 12. The lower end portion 36 of said aperture is reduced in size to form a shoulder 38 which faces toward the upper end of the housing. The upper portion of the opening 34 is sized to receive the bolt shank 15, and the reduced portion 36 is sized to receive the reduced portion 16 in a close fitting relation. The aperture 34 leads to a cavity 40 in the lower housing portion 28 for receiving a locking jaw assembly 42, and a lower cavity 49 for receiving the head 24 of an assembled bolt.

The locking jaw assembly 42, in the illustrated embodiment, comprises 3 separate jaw members 44, each of which has a groove 46 in the outer edge for receiving a retaining spring 48 and an inner edge 50 which is a segment of a circle.

The jaws have side edges 45 which fit together when the jaws are in the normal closed position as shown in FIG. 3, so that the inner edges 50 fit together forming a central aperture 54 which normally has a diameter less than that of the bolt head 24, but which is enlarged by the flexing of the spring 48 when a bolt head is inserted into the apaerture.

In the preferred embodiment of the invention, the jaw segments 44 are tapered in thickness from the inside edge 50 to the outer edges, so that they are thinner at the outer edge than at the inner edge. Therefore, as illustrated in FIG. 2, the upper surface of the jaw assembly slopes slightly downwardly from the center to the outer periphery, and the lower surface slopes slightly upwardly.

The cavity 40 in which the jaws are retained is slightly thicker in a vertical direction than the thickness of the jaw assembly, to allow free motion of the jaws in expanding to receive the head of the stud, and is slightly larger in diameter than the overall diameter of the jaw assembly to allow the necessary expension to allow insertion of the head of the stud.

The bolt is assembled in the usual manner, by inserting the head of the bolt into the opening 34 so that the tapered forward end 26 of the bolt head enters the jaw aperture 54 and spreads them apart by flexing of the spring 48, until the bolt head 24 passes through the opening, so that the jaws can then snap back to their original position, seating in the reduced neck 20 with the bolt head 24 disposed below the jaws.

The dimensions of the components are such that when the bolt head 24 has snapped through the jaws, the first shoulder 18 is substantially seated on the upwardly facing shoulder 38 in the upper housing portion, for a purpose to appear hereinafter.

Thereafter a force, such as a downward impact force, applied to the housing will be transmitted to the jaws at a circular line of contact 56 at the extreme bottom end of the aperture portion 36. The downward force at said circular line of contact is applied by the housing to the upper sloped surface of the jaw assembly around and in spaced relation to the central aperture 54, and causes a component of said force to be applied radially inwardly to the jaws, thereby tending to close the jaws more tightly about the reduced neck 20 of the bolt.

Similarly, an upward impact force applied to the bottom of the housing, with the bolt held in a fixed position, will be transmitted to the bottom sloped surface of the jaws at a circular line of contact 58 at the top end of the wall 45 of the lower cavity 49, and because of the upward and outward slope of the bottom surface of the jaw assembly, such force applied to the jaw assembly has a radially inward component which tends to force the jaws more tightly about the reduced neck portion 20 of the bolt.

The slope of the faces of the jaws, as illustrated in FIG. 2 is slightly exaggerated for clarity. It has been found that a slope of about 5° from a plane perpendicular to the axis of the bolt is satisfactory.

The provision of the additional shoulder 18 assists in preventing the insertion of a picking tool into the housing, since such tool would have to be capable of making two right angle bends to reach the locking jaws.

I claim:

1. A locking device for locking an elongated member having a head and an annular channel defining a locking shoulder, said locking device comprising:
   a housing, said housing including a first housing portion and a second housing portion, said first housing portion including a bore which defines a cavity for receiving the head of said elongated member, said first housing portion further including a counterbore which is coaxial with said bore and which cooperates with said second housing portion to define a cavity, said second housing portion including a bore which is coaxial with said bore and counterbore of said first housing portion;
   a locking jaw assembly disposed within said cavity, said locking jaw assembly comprising a plurality of radially movable locking jaws and spring means engaging said radially movable locking jaws, said spring means tending to urge said locking jaws radially inwardly to cooperate to define a generally centrally disposed opening, said locking jaws when displaced fully radially inwardly being receivable within said annular channel of said elongated element to lock said elongated element within said housing; and
   said plurality of locking jaws being provided with tapered surfaces for engaging said head and locking shoulder of said elongated member and said first and second housing portion whereby when said locking jaws are disposed within said annular channel in said elongated member, any attempt to displace said elongated member axially within said housing will generate forces tending to displace said locking jaws radially inwardly thereby maintaining said elongated element locked within said housing.

2. A locking device as claimed in claim 1 wherein said tapered surfaces are frustoconical and inclined at an angle of approximately 5 degrees from a plane perpendicular to said axis of said bores.

* * * * *